Sept. 8, 1970                E. P. ANDERSON                3,527,685
ANODE FOR CATHODIC PROTECTION OF TUBULAR MEMBERS
Filed Aug. 26, 1968

INVENTOR.
EDWARD P. ANDERSON
BY
AGENT

United States Patent Office 3,527,685
Patented Sept. 8, 1970

3,527,685
ANODE FOR CATHODIC PROTECTION
OF TUBULAR MEMBERS
Edward P. Anderson, Livingston, N.J., assignor to Engelhard Minerals & Chemicals Corporation, Newark, N.J., a corporation of Delaware
Filed Aug. 26, 1968, Ser. No. 755,055
Int. Cl. C23f 13/00
U.S. Cl. 204—196                                7 Claims

ABSTRACT OF THE DISCLOSURE

An elongated anode assembly for the cathodic protection of tubular members such as metal pipes and well casings, comprising an electrically conductive elongated core having its external surface coated with an insulation material, a plurality of metal anode pins each having head and stem portions, the pins being mounted in spaced relation to each other on and along the length of the insulated core with the heads exposed externally of the insulation material and the stems penetrating the insulation material in contact with the core, and an outer porous insulation sleeve mounted substantially co-extensively over the pin-mounted insulated core, whereby the heads of the anode pins are exposed to contact by an electrolyte through the porous sleeve.

---

While various types of anodes have been employed for the cathodic protection of underwater structures and pipe lines, such anodes are usually adapted to protect the external surfaces of, for example, pipe lines exposed to the electrolyte. However, there is also a need to protect the internal surfaces of pipes carrying electrolytes which are corrosive to the internal surfaces of the pipes. These pipes may be risers from deep well pumps which may average 300 feet in length and have inside diameters of from about 1½ to 10 inches. In order to effectively distribute the current inside the pipe, many anodes are required since about two and one-half pipe diameters in each direction, transverse and lengthwise, is about the maximum distance that adequate protection can be effectively distributed from an anode within the pipe.

The invention is directed to the provision of an elongated anode assembly which is economical and provides for an effective distribution of anodic current to the inside surfaces of tubular members carrying an electrolyte.

Figure 1:
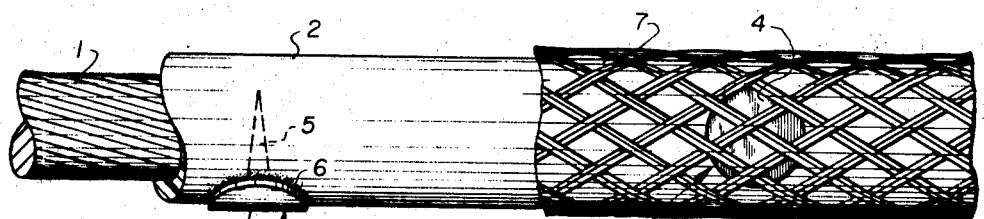
Figure 2:
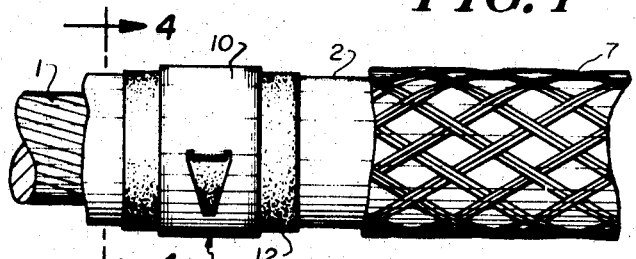
Figure 3:
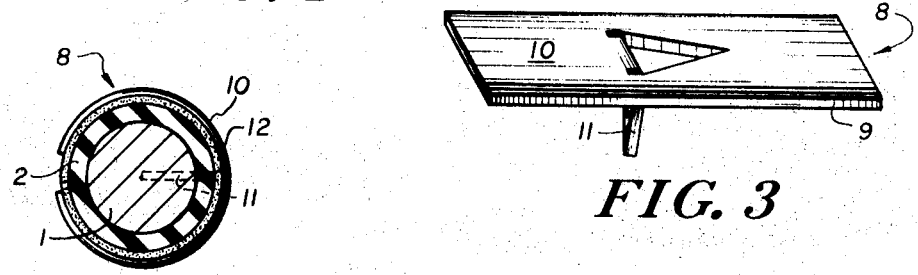
Figure 4:
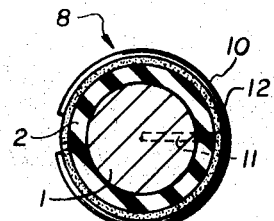
Figure 5:
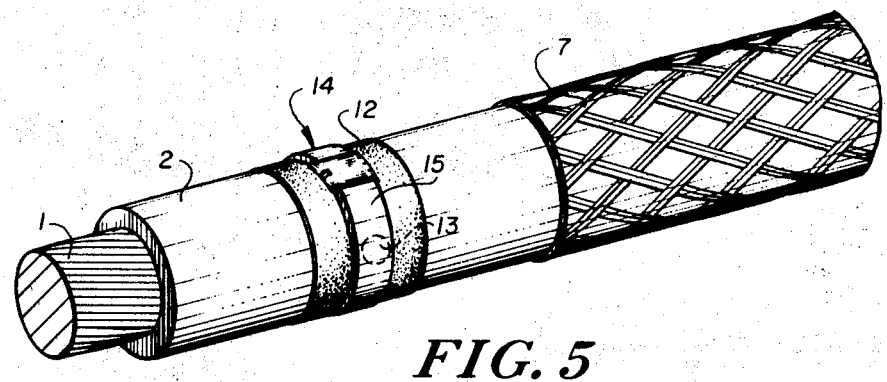

FIG. 1 illustrates an elevational view of an anode assembly according to the invention, FIG. 2 illustrates an elevational view of an anode assembly in modified form, FIG. 3 illustrates an isometric view of an anode pin of FIG. 2 prior to assembly thereon, FIG. 4 illustrates a cross-sectional view along lines 4—4 of FIG. 2, and FIG. 5 illustrates an isometric view of still another modification of the anode assembly of the invention.

Regarding FIG. 1, the anode assembly comprises an elongated electrically conductive core 1, of, for example, stranded copper wire. The core 1 is covered along its length with an insulation material 2 such as a layer of rubber or a resin having insulation properties and impervious to liquids. A plurality of anode pins 3, each having a head 4 and stem 5 are mounted in spaced relation to each other on and along the length of the insulated core with the heads 4 exposed externally of the insulation layer 2 and the stems 5 penetrating the insulation material in contact with the core 1. To prevent any possible leakage of electrolyte between the head 4 and stem 5 into contact with the core, a suitable sealing means 6, for example a sealing cement, is applied between the undersurface of the head 4 and the insulation layer 2. Advantageously, the pins are not only spaced from each other along the length of the insulated core, but they are also spaced from each other circumferentially of the insulated core such as staggered relative to each other circumferentially of the insulated cores, or, for example, the pins may follow a spiral path along the length of the insulated core. Having the anode pins mounted on the insulated core, an outer porous insulation sleeve 7 is mounted substantially co-extensively over the pin-mounted and insulated core, whereby the heads 4 of the anode pins 3 are prevented from making electrical contact with the inner surfaces of the pipe and the heads 4 are exposed to contact by an electrolyte through the porous sleeve. The outer porous sleeve may be composed of polytetrafluoroethylene having a multitude of perforations therethrough or it may be a sleeve braided from polytetrafluoroethylene strands as illustrated.

Preferably, the pins 3 are composed of niobium, titanium or tantalum with the head 4 having a layer of platinum on its exposed surfaces.

FIGS. 2 and 4 illustrate a modification of the invention wherein reference numerals identical with the reference numerals of FIG. 1 indicate identical structures, the modification being in the form of the anode pins and their associated sealing means between the pin head and the core insulation layer. In lieu of the pins 3 illustrated by FIG. 1, the pins 8, (one being shown) are made from a strip of metal as shown in FIG. 3 having an enlarged elongated head 9 composed of, e.g. niobium having an outer surface layer 10 of platinum and a stem 11 formed by a triangular protrusion through the strip. In application, a sealing pad 12, such as a neoprene tape, is mounted circumferentially of the insulation material 2, the stem 11 is pressed to penetrate the sealing pad 12 and insulation material 2 and to contact the core 1. The elongated head is then bent to embrace the insulated core, as illustrated by FIG. 4, with the platinum surface 10 exposed outside the insulation layer 2 and with the sealing pad 12 being between the undersurface of the head 9 and the insulation 2. Thereafter, the porous insulation sleeve is mounted over the anode pin 8 as illustrated with respect to the pins 3 of FIG. 1.

FIG. 5 illustrates still another modification of the invention wherein reference numerals identical with the reference numerals of FIGS. 2 and 4 indicate identical structures, the modification being in the form of the anode. In FIG. 5, pins 13 having the form of pins 3 of FIG. 1 are pressed to penetrate the sealing pad 12 and insulation 2 as illustrated by FIG. 1. The pins 13 are composed of niobium, titanium or tantalum. Thereafter, bale-type clamps 14 are engaged circumferentially of the padded and insulated core in electrical contact with the pin heads, the bale being composed of niobium, titanium or tantalum having a platinum surface 15. Thereafter, the bales are covered by the porous sleeve 7 and illustrated in FIGS. 1, 2 and 4.

Various modifications of the invention are contemplated within the scope of the appended claims.

What is claimed is:

1. An anode assembly comprising an electrically conductive elongated core having its external surface coated with an insulation coating, a plurality of metal anode pins each having head and stem portions, the pins being mounted in spaced relationship to each other on and along the length of the insulated core with the heads exposed externally of the insulation coating and the stems penetrating the insulation coating in contact with the core, and an outer porous insulation sleeve mounted substantially co-extensively over the pin-mounted insulated core, whereby the heads of the anode pins are exposable to contact by an electrolyte through the porous sleeve.

2. An anode assembly according to claim 1, wherein the core is composed of stranded wire.

3. An anode assembly according to claim 1, wherein the anode pin comprises an enlarged head in the form of a metal strip circumferentially embracing the insulated coating.

4. An anode assembly according to claim 1, further comprising metal clamp strips mounted circumferentially of the insulated core in contact with the pin heads.

5. An anode assembly according to claim 3, further comprising a sealing means mounted between the pin head and the insulation coating.

6. An anode assembly according to claim 1, wherein the pins are spaced from each other longitudinally of the coated core and also spaced from each other circumferentially of the insulated core.

7. An anode assembly according to claim 1, wherein the outer porous sleeve is a braided sleeve.

References Cited

UNITED STATES PATENTS 3,409,530  11/1968  Locke et al. _____ 204—196

TA-HSUNG TUNG, Primary Examiner

U.S. Cl. X.R.

204—147, 280, 282, 290